(12) United States Patent
Brillhart et al.

(10) Patent No.: US 8,412,661 B2
(45) Date of Patent: Apr. 2, 2013

(54) SMART SURVEY WITH PROGRESSIVE DISCOVERY

(75) Inventors: David C. Brillhart, Orlando, FL (US); Christopher J. Dawson, Arlington, VA (US); Nicholas J. Karels, Aurora, IL (US); Mathew B. Trevathan, Kennesaw, GA (US)

(73) Assignee: International Business Machines Corporation, Armonk, NY (US)

( * ) Notice: Subject to any disclaimer, the term of this patent is extended or adjusted under 35 U.S.C. 154(b) by 307 days.

(21) Appl. No.: 12/953,506

(22) Filed: Nov. 24, 2010

(65) Prior Publication Data

US 2012/0130934 A1    May 24, 2012

(51) Int. Cl.
*G06G 7/00*    (2006.01)
*G06Q 10/00*    (2012.01)

(52) U.S. Cl. .......................... 706/46; 705/7.11
(58) Field of Classification Search .................. None
See application file for complete search history.

(56) References Cited

U.S. PATENT DOCUMENTS

| | | | |
|---|---|---|---|
| 6,938,068 B1 * | 8/2005 | Kraft et al. ................ | 709/203 |
| 8,200,770 B2 * | 6/2012 | Ostertag et al. ............ | 709/207 |
| 2007/0168578 A1 | 7/2007 | Balchandran et al. | |
| 2008/0046520 A1 * | 2/2008 | Jager et al. ................ | 709/206 |
| 2009/0150217 A1 | 6/2009 | Luff | |
| 2009/0249314 A1 | 10/2009 | Weerman | |
| 2010/0070554 A1 * | 3/2010 | Richardson et al. ........ | 709/202 |

OTHER PUBLICATIONS

Richards et al., Expertise Recommendation: A two-way knowledge communication channel, 2008.*
Yimam-seid et al., Expert Finding Systems for Organizations: Problem and Domain Analysis and the DEMOIR approach.*
Okoli et al., The Delphi method as a research tool: an example, design considerations, and applications, 2004.*
Survey Monkey, Smart Survey Design, 1999-2010, 35 pp.
SPSS, Inc., Deeper Understanding, Improve Performance, PASW Data Collection for Business, 2009, 6 pp.
Six 9s Associates, Inc., Smart Phone Usage of an Online Nationwide Tracking Study, Six Customer Research, V1.0, 2009, 3 pp.
Florida Department of Transportation, Victoria A. Perk and Nilgun Kamp, Handbook of Automated Data Collection Methods for the National Transit Database, Oct. 2003, 64 PP.

* cited by examiner

*Primary Examiner* — Jeffrey A Gaffin
*Assistant Examiner* — Mikayla Chubb
(74) *Attorney, Agent, or Firm* — Patrick J. Daugherty; Driggs, Hogg, Daugherty & Del Zoppo Co., LPA

(57) ABSTRACT

Embodiments of the invention collect data or information from a dynamic and adaptive target group selection. Sets of experts are selected that each have higher value metrics scores relative to scores of other, unselected experts of a population of known experts, and wherein the metric values are indicative of an expertise relevant to one or more questions in a survey. Responses to the survey are used to expand the set of experts by adding experts noted in answer referrals, and to automatically update the expert value metric scores as a function of response timeliness and of degrees of correlation of answers to an expected answer or other norm. The survey is updated by removing satisfied questions, and expert selections, answers analysis and survey updating and resending steps are iteratively repeated until each question is satisfied, wherein the expert sets are dynamically revised for each iteration.

21 Claims, 3 Drawing Sheets

SMART SURVEY WITH PROGRESSIVE DISCOVERY

BACKGROUND

The present invention relates to systems and methods for collecting data or information from a population of people.

Currently, the common approach to complex data discovery is to send a large survey with potentially hundreds of questions to a large population of people who might have some insight that will be helpful. Response rates are often underwhelming, which may lead to low confidence in the data received for several reasons; first, because of the low percentage of responses, and also because there may be some unknown skew in those that did respond. For example, if 20% responded, there may be some reason why those 20% felt compelled to respond, such as they are highly dissatisfied, wherein their responses may not be indicative of the responses of the 80% that did not respond, which may be satisfied or not strongly positive or negative. Also, there is evidence that non-response may be driven by an intimidation factor of being presented with a large survey with a large number of questions, many of which are irrelevant to a particular person.

BRIEF SUMMARY

In one embodiment, a method is provided for collection of data or information from a dynamic and adaptive target group selection. The method includes selecting a set of experts that each have higher value metrics scores relative to the scores of other unselected experts of a population of known experts, and wherein the metric values are indicative of an expertise relevant to one or more questions in a survey. Responses to the survey are used to expand the set of experts by adding experts noted in answer referrals, and to automatically update the expert value metric scores as a function of response timeliness and a degree of correlation of an answer to an expected answer or other norm. The survey is updated by removing satisfied questions, and updated surveys are iteratively sent to updated sets of experts selected from the expanded expert sets as relevant to the remaining questions and having higher updated metric values, until each question in the updated survey is satisfied and removed.

In another embodiment, a computer system includes a processing unit, computer readable memory and a computer readable storage system. Program instructions on the computer readable storage system cause the processing unit to select experts that each have higher value metrics scores relative to other unselected experts of a population of known experts and that are indicative of an expertise relevant to one or more questions in a survey, and also to expand the set of experts by adding experts noted in referrals in received answers. Instructions also cause the processing unit to determine a degree of correlation of an answer within a response to an expected answer or other norm, and to update the expert value metric scores as a function of response timeliness and the determined degree of correlation to the expected answer or norm. Instructions are also further to update the survey by removing questions satisfied by response answers and send out updated surveys to selected experts until each question in the survey questions is satisfied and removed, as determined by iterative repetitive application of the other, above instructions.

In another embodiment, a computer program product includes program instructions to select experts that each have higher value metrics scores relative to other unselected experts of a population of known experts and that are indicative of an expertise relevant to one or more questions in a survey, and also to expand the set of experts by adding experts noted in referrals in received answers. Instructions are also to determine a degree of correlation of an answer within a response to an expected answer or other norm, and to update the expert value metric scores as a function of response timeliness and the determined degree of correlation to the expected answer or norm. Instructions are also further to update the survey by removing questions satisfied by response answers and send out updated surveys to selected experts until each question in the survey questions is satisfied and removed as determined by iterative repetitive application of the other, above instructions.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

Figure 1:
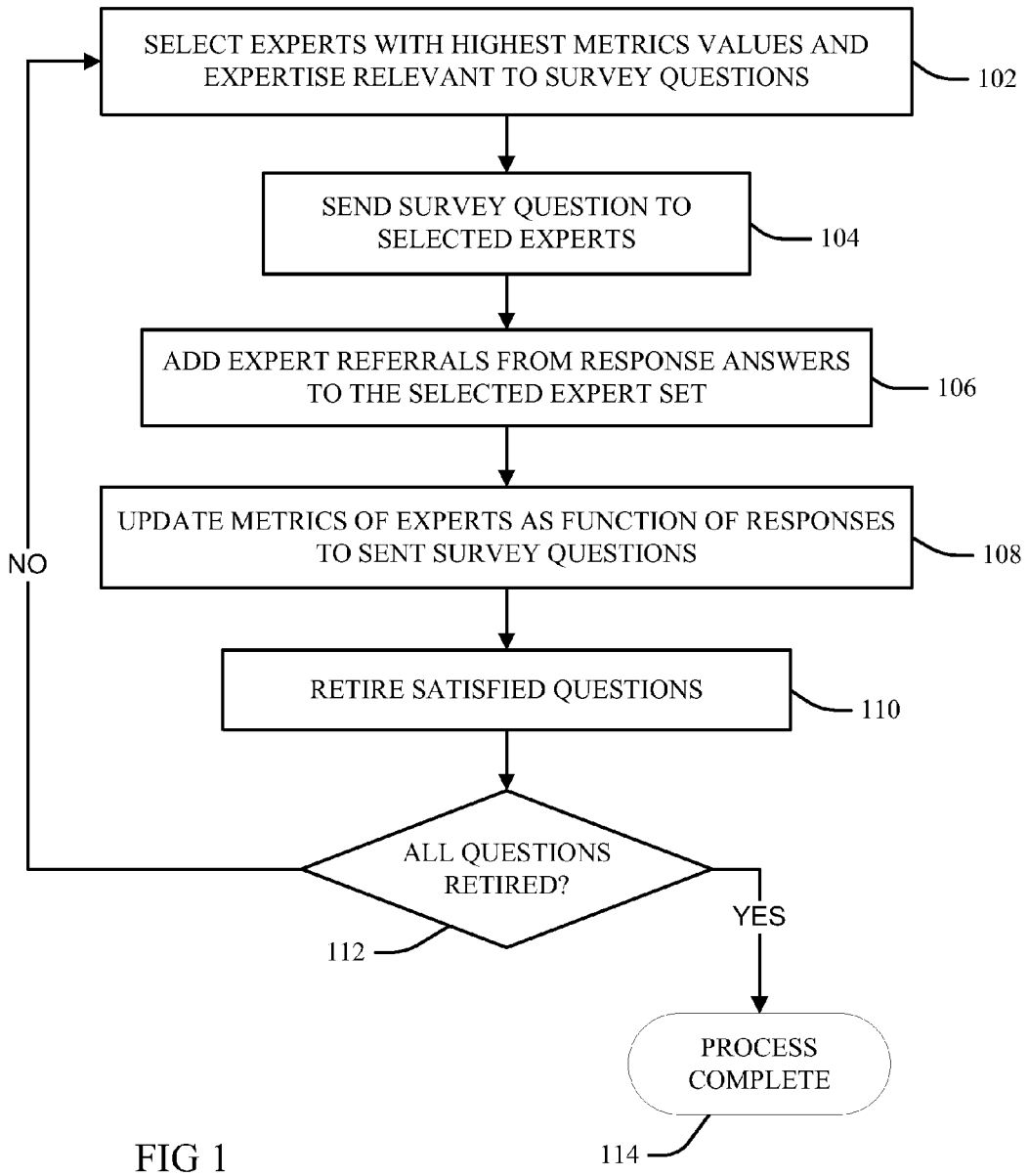
FIG. 1 is a diagrammatic illustration of an embodiment of a system, method or process according to the present invention for collection of data or information from a dynamic and adaptive target group selection.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage device. A computer readable storage device may be, for example, but not limited to, an electronic, magnetic, optical, electromagnetic, or semiconductor system, apparatus, or device, or any suitable combination of the foregoing. More specific examples (a non-exhaustive list) of the computer readable storage device would include the following: a portable computer diskette, a hard disk, a random access memory (RAM), a read-only memory (ROM), an erasable programmable read-only memory (EPROM or Flash memory), a portable compact disc read-only memory (CD- ROM), an optical storage device, a magnetic storage device, or any suitable combination of the foregoing. In the context of this document, a computer readable storage device may be any tangible device that does not propagate but can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Choosing recipients for questionnaires may be problematic in prior art methodology, for example it may take many weeks to determine a contact list, and this list is often only partially complete and accurate. Further, knowing which of many possible questions are appropriate to ask of which contacts requires manpower and resources. Often a default approach is to send an entire questionnaire to all known appropriate parties and hope for the best. Once sent, a common problem with a large questionnaire is lack of response, since recipients may decide that they do not have the free time required to provide a large number (even hundreds) of answers, many of which are not relevant to their position or skill set. Discovery teams must manually track returns to determine compliance and data quality, and send reminders to those who are delinquent and rework requests to those returning incomplete or inaccurate questionnaires. Finally, the discovery team must manually correlate answers in meaningful ways to explore trends and patterns to provide insight of value about the complex questionnaire environment.

Referring now to FIG. 1, an embodiment of a method or system according to the present invention is illustrated for collection of data or information from a dynamic and adaptive target group selection. At 102 an initial subset of primary expert contacts is automatically identified and selected from a larger inclusive organizational or knowledge-base population in response to having higher expert value metrics scores relative to value metric scores of other unselected experts of a population of known experts, and that are indicative of an expertise relevant to at least one question in a plurality of survey questions. Thus, a first subset of possible experts may be selected from historic data indicating previous expert associations relevant to current questions, and also evidencing relatively higher metrics that may indicate higher probabilities of receiving timely, quality responses from the survey questions.

At 104 the plurality of survey questions are sent to the selected set of experts. At 106 the system automatically expands the selected set of experts by adding experts from the population of known experts that are noted in referrals in answers received in response to the sent questions. At 108 the value metric scores of the expanded set experts are also automatically updated (for example, via a programmable device) as a function of characteristics of the expert's responses to the survey questions, for example a timeliness of the responses received from associated experts, and of qualities of the responses relative to other responses or expected answers (degrees of correlations of answer within said responses to an expected answer, etc.). More particularly, embodiments may update expert value metrics for associated experts in response to determining a degree of correlation of their answers to an expected answer or answer characteristic, for example to a hypothesis answer or a majority answer, or with respect to a variance from observed clusters of answers, etc.

At 110 the plurality of survey questions are also updated by removing questions satisfied by response answers from the selected set of experts. For example, if a sufficient representation of the population has completed a question and/or generated a sufficient number of responses having a sufficient correlation/variance with respect to other answers, etc.

At 112 the system and process steps thus described iteratively repeat until each of the survey questions is satisfied, wherein the process ends at 114. More particularly, each iteration at 102-104-106-108-110 refines the set of experts receiving further refined sets of survey questions. Each new survey iteration comprises questions in the survey that have not yet been satisfied through previous iterations and responses, wherein only those unsatisfied questions need be sent out, and only to the new experts selected as a function of their relative metric values. Additionally, follow-up questions may also be added to the survey set, for example in response to earlier question answers. Lower scoring experts may also be dropped from the set in favor of higher scoring experts, in expectation that the higher scoring experts are more likely to provide satisfactory answers, and/or to respond, etc. Thus, additional targets, questions and surveys may be chosen, generated, etc. until all questions are satisfied.

Embodiments of the present invention may increase efficiencies by reducing the total number of experts contacted through each survey iteration targeting questions and surveys to higher-value experts, wherein the corresponding responses may be as good or better in quality and/or totality compared to prior art techniques that send out surveys to more but lower-quality respondents, which may have higher overall response rates but comprising lower overall quality that wastes resources needed to filter out the low-quality, irrelevant results.

New additional experts suggested or noted by returned surveys are tagged with social rating and quality metrics, or their current metrics are updated in a scoring process that identifies expert individuals from collected survey data received from the initial primary contact subset in response to the initial baseline survey. The initial baseline survey questions may generally prompt the targets to uncover contact information for those other individuals having specific expertise relevant to the baseline survey. As key individuals are identified and catalogued, they may be assigned a value metric that may be associated with the different subject areas, systems or applications that they may be responsible for, or with which they may be regarded as an expert. The embodiment thus self-generates a dynamic network of contacts for use with each survey iteration, wherein a selected set of contacts may expand or contract with each iteration, to which targeted questions are sent from a databank of tagged questions. An expert's metric value may increase if multiple respondents refer to the same expert as an appropriate person to answer a given question or set of questions, or decrease relative to another expert for relatively fewer references to a given item or category.

Figure 2:
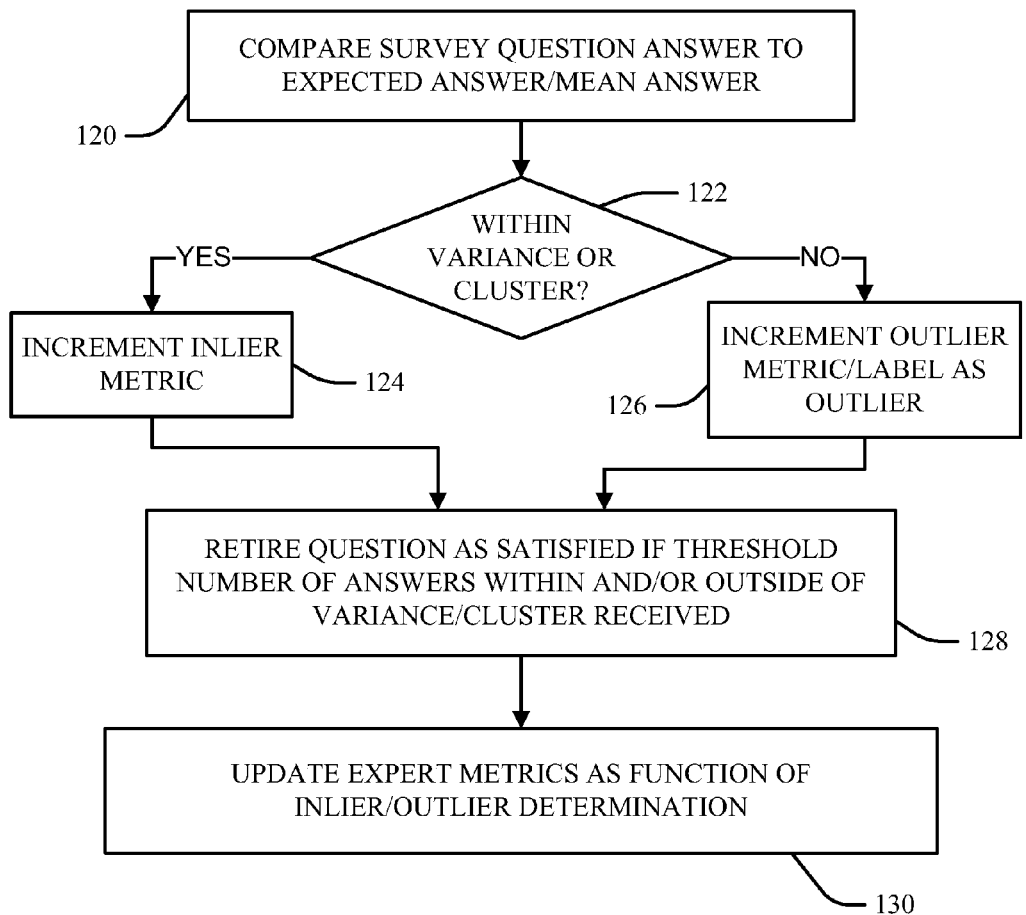
FIG. 2 is a diagrammatic illustration of an embodiment of a system, method or process according to the present invention for evaluating answers for satisfaction of questions and for adjusting expert metric values and outlier status.

FIG. 2 is a block diagram illustration of expert metric adjustments and question satisfactions determined from survey responses in one embodiment according to the present invention. At 120 survey response answers are compared to expected or mean answers or some other normative standard, and at 122 accordingly identified as outliers or inliers. A metric value of the answering expert is accordingly incremented or otherwise adjusted as a result of the outlier or inlier determination at 126 or 124, respectively, and wherein the expert may also be labeled as an outlier at 126. At 128 the question associated with the answer is evaluated for retirement, and retired if a question satisfaction standard is met, for example if a sufficient number of inlier or combination of inlier and outlier answers has been received, and other criteria may also be applied as discussed elsewhere in the present application. The metric value of the answering expert is also adjusted as a function of the answer inlier or outlier status at 130.

Metric scores may further include quality criteria. For example, an expert set may be dynamically composed based on social referral rankings and also on other criteria. In one embodiment, the timeliness of responses is used to raise or lower a value metric, to generally reflect a policy that the quicker they get back with a response, the more valuable they are as participants and thus more likely to be included in subsequent iterations. Thus, in one example, the value metric score of an expert is increased or decreased as a function of comparing an elapsed time of a response (from sending the questions to receiving the response) to a standard or normal sent response time. Norms may be specified, or they may be dynamic, for example determining means or other average response times from actual survey responses, and increasing expert values for quicker responses and lowering values for slower responses, or for failures to respond at all. A different (longer) threshold may be used to determine an allowable time for response, wherein exceeding it may result in a failure to respond value adjustment. Reminders may also be sent to an expert in response to a failure to receive an answer within a threshold time for response. Thus, an expert may be removed from a set of experts in response to a failure to receive a response within an allowable time for response to the reminder, or if a specified number of reminders fails to trigger a response, or their metric drops below a threshold value through downward increments, and the expert may be "deactivated" for this and/or other subsequent survey iterations, perhaps flagging the expert a non-responder for a final results report.

Expert metric values, as well as question satisfaction determinations, may also be adjusted or determined as a function of correlation of answers to those of other experts in their domain, for example, scoring those that do not tend to have outlier answers higher than other experts whose answers trend outside of expected answer norms. Correlations to a hypothesis answer for a question may also be utilized, for example scoring experts whose answers are within reason to what is expected (within a normative cluster of answers, or within a threshold variance of expected answers) higher than those other experts tending toward outlier answers (outside of a cluster or variance).

By tagging each of the population of experts to whom the surveys are sent with social ratings, quality scores and other metrics, the system may dynamically revise and maintain expert lists in real-time for a given question or survey. Thus, in some embodiments, only the top three metric value experts indicated as relevant to a given question receive the survey question, wherein this selection may change with each survey iteration based on updating the expert metrics dynamically and iteratively with each round of question responses.

The invention performs data collection in a smart or intelligent fashion that learns from early returns and modifies the approach based on a validation of the information, a validation of the respondents, and a refined targeting of questions to the most appropriate recipient demographic, and wherein target groups may expand or contract based on referrals from current recipients. The expert-system survey tool thereby self-generates an expanding population of target subject matter experts from which it solicit responses, the subject selected by referrals from experts already in the population of known users. Once enough experts are found, of a sufficient quality metric rating, the system may also stop asking for more referrals. Thus, additional experts may be identified and added to a previous expert set; questions may be differently targeted to experts within a current or previous set, for example, a domain of expertise may be revised for an expert, resulting in different questions for that expert); or experts may be dropped from the set, for example through lack of or low rates of cross-references from others of the set or low quality metrics.

Each survey iteration may reach out to newly included experts, and also ensure that experts already contacted or responding do not receive duplicate questions or surveys (for example, decrementing their value metric or otherwise dropping them from subsequent survey iterations). Depending on the value of accepted answers, additional survey iterations may include generating more detailed questions with regard to an answer, and which could be sent to larger or smaller sets relative to those who responded to the higher-level first question: for example, to a subset of targets who responded most accurately with regard to correlation/variance and/or in a relatively more timely fashion, to those who had the highest cross-reference referral rate from other experts, or to those specifically designated as the best to answer a certain question.

Follow-up questions at any iteration may be automatically generated in response to previous responses through correlation/variance data. For example, "Why is the answer to [question A] equal to [answer 1]"? may be automatically generated from a review of data listing [answer 1] as the answer value for the response to [question A], or "Most respondents indicated that the answer to [question A] is equal to [answer 2], why did you answer with [answer 1]?"Follow-up questions may also be manually added to a question bank in response to a survey administrator review of answers, including a correlation/variances from majority or accepted answers. Answers may also be weighted based on the assessed competence of the person providing the answer, for example their skill or experience level if related to the question being asked, and/or as a function or a peer referral ranking.

Questions may be retired from a survey at 114 once a threshold is reached based on a number of answers, a weighting of the one or more answers, or when a consensus is indicated by the answers (for example, few occurrences of contradicting answers within an answer set, less than a threshold value).

Thus, embodiments of the present invention provide an expert-system survey tool that adaptively self-generates a dynamically expanding, contracting or otherwise refined population of target subject matter experts from which it solicit responses. These come from referrals from experts already in the population of known users. The numbers of experts may be limited to provide further efficiencies; once enough experts are found, of a sufficient quality rating as indicated by their metrics relevant to the question, the system may stop asking for more referrals, through application of user or system defined thresholds or other limiting criteria. The present invention makes use of expert system techniques to progressively discover insights and automatically build key individuals that are listed as targeted subject matter experts. These key individuals may be identified based on a tree-based referral system that will intelligently direct relevant questions to a self-expanding list of contacts.

The process learns from each return and modifies a survey approach based on a validation of the information, a validation of the respondents, and a refined targeting of questions to a more appropriate recipient demographic (which itself expands based on referrals from current recipients). Rather than send a large collection of questions to all potential recipients all at once, processes according to the present invention ask a smaller number of key questions, and get responses to progressively refine or broaden discovery until desired results are achieved in terms of information gathered and confidence level attained. The metrics may also be used to eliminate duplication of requests to certain individuals or to multiple experts with regard to the same subject, for example, sending a query to no more than three subject matter area experts rather than to every one, and optionally further selecting the most historically responsive three of possible qualifying experts, further streamlining the automated process of data collection across a business or other enterprise comprising multitudes of possible survey targets.

In one aspect, the process may automatically accept referrals from respondents to amend a targeted population of recipients based on skill/knowledge qualities, for example Bob Jones replies that "Joe Smith is our resident subject matter expert on topic XYZ, so ask him", directly and automatically resulting in a subsequent survey query to Joe Smith. Due to the complexity of managing and collecting such data, automated embodiments of the present invention provide a smart survey system that will substantially reduce the amount of time and improve the accuracy of the data collected relative to manual survey methods, which are generally time-intensive and normally performed by different individuals meeting in person, scheduling conference calls, manually piecing together data and performing individual or cooperative manual analysis, etc.

Validation key range and/or type may be applied in real-time to question answers, in order to avoid data errors or poor results from inconsistent answers, etc. Embodiments also track returns and manage reminder and rework requests, for example only resending questions that need better or more responses. Data inaccuracy may also be reduced through automatically filtering or otherwise analyzing answers at input to prevent input of human errors, elements of bias or inappropriate replies from data, rather than later, subsequently identifying and removing such errors. Some embodiments filter the data to remove sensitive words or terms objectionable to certain individuals or organizations, or that may be subject to misinterpretation, before they are entered into database or other data storage means.

In another aspect intelligent computer and system data collection provides for improved accuracy and lowered risk for performing sensitive tasks which may include collecting confidential information which may impose duties upon the collector. By using an automated smart survey to collect and analyze data, confidential information may be easily encrypted at input or otherwise protected from subsequent, unauthorized disclosure.

In some embodiments, the different target individuals are each provided with a Uniform Resource Locator (URL) that links to a smart survey containing key Extensible Mark-up Language (XML) tags used to identify them and their value metric (for example, a numeric "expert score" reflecting their relative expert status, timely responsiveness, etc.), and also to store the data within a relational database. Every time a subject matter expert or other key individual is identified in an answer as part of a data collection process, the value metric for the key individual may be revised (generally increasing with every positive reference to their name). The value metric may also be associated with specific parts of a particular enterprise associated with the population of experts, for example components within an organization's computing infrastructure, application or computer system, a business process in a service-oriented architecture, etc., and that has been identified as part of or relevant to the smart survey.

Notice and other reporting on completion rates may be provided in a dashboard or other user interface, and wherein return data may be organized into a set of visualization graphics to provide a user, discovery team, etc., with a first-pass view of a complex environment. For example, as data is collected, results may be displayed on a network computer dashboard that will allow a user or data collection team to verify the accuracy of the data collected, and also to communicate with the key individuals displayed that are associated with the different parts of the infrastructure. In some embodiments, a dynamic web page is utilized to collect the value metrics data and store it in a relational database, one that enables identifying the key individuals in different parts of the computing environment. A web service or web component may communicate with the smart survey system and update the relevant XML tags and value metrics for collecting answers and other data during a survey process.

Some embodiments determine when a result for a survey question has met a "condition of satisfaction" (CoS) so that it may be retired. Questions that naturally have a limited number of answers (for example, true/false, or high/med/low, etc.) define a range or type of values for application of answer validation processes. For each survey question, a set of responders are identified along with their contact information, generally a statistically significant number of responders for each question, though this is not a requirement. Thus, systems may automatically send each responder a URL link, which contains a web page with a custom interface that only presents the questions they are targeted to answer. Each question has both an answer field and a field in which the responder can enter additional contacts that they feel might be better suited to answer that particular question; in some embodiments, numbers of references may be limited, for example up to two.

As answers are returned for a given question, they are analyzed against one or more "condition of satisfaction" (CoS) metrics or thresholds. Examples of CoS satisfaction metrics include a minimum threshold number of responders replying with the satisfying answer, or that a set of responses (minus outliers) includes an answer value within a variance value or other tolerance, in one aspect validating accuracy of an answer through comparisons when the same question generates responses from multiple contacts, for example through variance and correlation analysis. Responders whose answers are outliers (for example, falling outside a defined general cluster) may be sent a clarification request to explain why their answer might be significantly different from the norm. They may also be given an opportunity to re-submit an answer that is within the norm, which will remove them from the outlier group.

In some embodiments, when a survey question appears to have met its condition of satisfaction metric, the question is sent with its answers and related statistics to a survey administrator entity for acceptance. The data may also include those "clarification responses" from the responders whose answers were outside the norm. If the survey administrator is satisfied and accepts the results (for example, the answer meets variance or correlation standards, or an outlier divergence is adequately accounted for by a clarification response), the survey question is retired from further survey use and the answer is accepted. A survey dashboard may be updated to reflect the completion status of the survey question and the partial results posted. In another aspect, respondents to the retired question may have their expert ranking metric updated, based on factors such as their timeliness, the quality of their answer (amount of variance or correlation to a majority or generally accepted answer), their referral rate (which takes into account the quality of the referee), etc.

If the process or survey administrator adds a new related question to the survey, based on the results of the retired question, the new related question will enter the system and be processed as a new question and posted to the associated target respondents of the retired question. It may also be linked to the retired question such that the retired question and the accepted answer may be displayed (for example, provided in the dynamic web page screen) with the new question, in one aspect to provide context for the new question.

Further, once a survey is complete, a dashboard may reflect the final state of each of the questions and answers, a confidence level in each of the answers, and various other reports such as the number of respondents, the quality value for each respondent, the list of non respondents, etc.

By providing for the self-retirement of a question, the present invention eliminates the need for manual intervention to edit on-going surveys by reducing the survey's bank of questions. Once a question has been responded to in a satisfactory fashion, that question is retired, marked as complete. A variety of standards may be used, and in one example the condition for satisfaction is that three domain experts have responded with answers that have a moderately high correlation factor, indicating a high confidence in the answer sufficient to eliminate the need for further expert consideration of the question.

Embodiments of the present invention may also automatically weed out experts with low ratings. Follow-up queries and confirmation requests to an expert whose answer is an outlier compared to answers from other experts may also notify them of their outlier status, which may cause them to rethink their answer in view of its outlier status and allow them to revise, confirm or defend their opposing view. In one aspect, this feedback may influence the social ranking aspect of an expert metric, one based on how their answers in general correlate to a hypothesis or to other expert answers. Further, a subset of experts may be selected to intentionally include social outliers, in order to seek broader viewpoints or range of answers, or to test strength of responses: for example, if outlier answers correlate with those of non-outliers, then confidence in the answer may be enhanced, as differing viewpoints agree on this answer.

Outliers may also be quickly identified with respect to divergence from a hypothesis answer associated from an initial question, even where historic data does not indicate or provide enough data to determine outlier status. For example, if the question is, "Please rate the overall maturity of your change control process between 0 and 5, where 5 is a world-class environment", and the hypothesis answer might be in the range of 1.5-3.0, then initial answers outside of this range may result in an outlier status, or an outlier metric increment.

Figure 3:
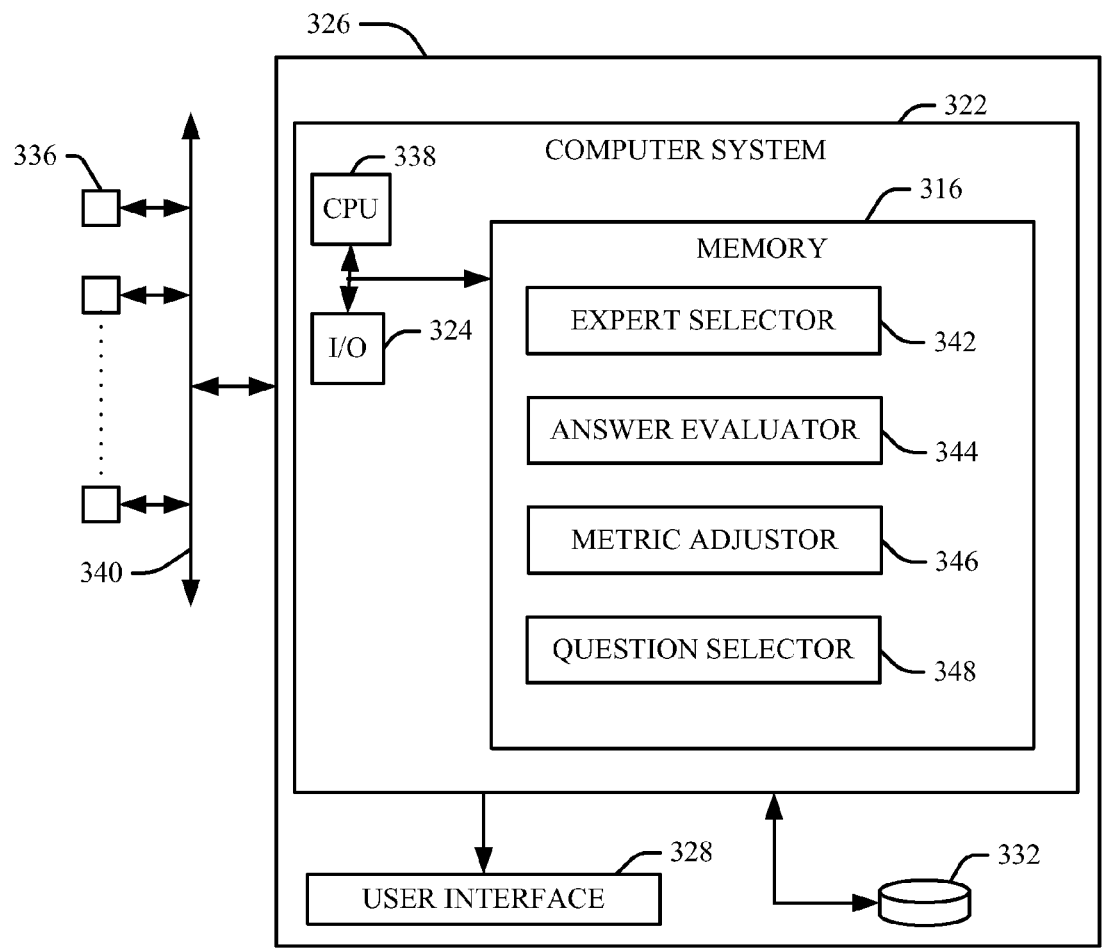
FIG. 3 is a diagrammatic illustration of a computerized implementation of an embodiment of the present invention.

Referring now to FIG. 3, an exemplary computerized implementation of an embodiment of the present invention includes client computer or other programmable device 322 in communication with a user interface 328 and with one or more third party servers 336 accessible through an SSL or other secure web interface 340, for example in response to computer readable code in a file residing in a memory 316 or a storage system 332 within a computer network infrastructure 326. The code, when executed by the central processor 338, provides expert selector 342, answer evaluator 344, expert metric value adjustor 346 and question satisfier/selector 348 components that perform one or more of the process and system functions described above with respect to FIGS. 1 and 2.

The implementation 326 is intended to demonstrate, among other things, that the present invention could be implemented within a network environment (e.g., the Internet, a wide area network (WAN), a local area network (LAN) or a virtual private network (VPN), etc.) Communication can occur via any combination of various types of communications links: for example, communication links can comprise addressable connections that may utilize any combination of wired and/or wireless transmission methods.

Where communications occur via the Internet, connectivity could be provided by conventional TCP/IP sockets-based protocol, and an Internet service provider could be used to establish connectivity to the Internet. Still yet, the network infrastructure 326 is intended to demonstrate that an application of an embodiment of the invention can be deployed, managed, serviced, etc. by a service provider who offers to implement, deploy, and/or perform the functions of the present invention for others.

The computer 322 comprises various components, some of which are illustrated within the computer 322. More particularly, as shown, the computer 322 includes a processing unit (CPU) 338 in communication with the memory 316 and with one or more external I/O devices/resources 324, user interfaces 328 and storage systems 332. In general, the processing unit 338 may execute computer program code, such as the code to implement one or more of the process steps illustrated in the Figures, which may be stored in the memory 316 and/or external storage system 332 or user interface device 328.

The network infrastructure 326 is only illustrative of various types of computer infrastructures for implementing the invention. For example, in one embodiment, computer infrastructure 326 comprises two or more computing devices (e.g., a server cluster) that communicate over a network. Moreover, the computer 322 is only representative of various possible computer systems that can include numerous combinations of hardware. To this extent, in other embodiments, the computer 322 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Moreover, the processing unit 338 may comprise a single processing unit, or be distributed across one or more processing units in one or more locations, e.g., on a client and server. Similarly, the memory 316 and/or the storage system 332 can comprise any combination of various types of data storage and/or transmission media that reside at one or more physical locations. Further, I/O interfaces 324 can comprise any system for exchanging information with one or more of the external device 328. Still further, it is understood that one or more additional components (e.g., system software, math co-processing unit, etc.), not shown, can be included in the computer 322.

One embodiment performs process steps of the invention on a subscription, advertising, and/or fee basis. That is, a service provider could offer to create, maintain, and support, etc., a computer infrastructure, such as the network computer infrastructure 326 that performs the process steps of the invention, for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for executing one or more of the processes, systems and articles according to the present invention as described above. In this case, a computer infrastructure, such as the computer infrastructure 326, can be provided and one or more systems for performing the process steps of the invention can be obtained (e.g., created, purchased, used, modified, etc.) and deployed to the computer infrastructure. To this extent, the deployment of a system can comprise one or more of: (1) installing program code on a computing device, such as the computers/devices 322/336, from a computer-readable medium; (2) adding one or more computing devices to the computer infrastructure; and (3) incorporating and/or modifying one or more existing systems of the computer infrastructure to enable the computer infrastructure to perform the process steps of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

Certain examples and elements described in the present specification, including in the claims and as illustrated in the Figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for collection of data or information from a dynamic and adaptive target group selection, the method comprising:

selecting a set of experts that each have higher value metrics scores relative to value metric scores of other unselected experts of a population of known experts and that are indicative of an expertise relevant to at least one question in a plurality of survey questions;

sending the plurality of survey questions to the selected set of experts;

expanding the selected set of experts by adding experts from the population of known experts that are noted in referrals in answers received in response to the sent questions;

automatically updating the value metric scores of the expanded set of experts via a programmable device as a function of a timeliness of a response received from an associated expert and a degree of correlation of an answer within said response received from the associated expert to an expected answer;

updating the plurality of survey questions by removing questions satisfied by response answers from the selected set of experts; and repeating steps of selecting an updated set of experts that each have higher value metrics scores relative to value metric scores of other unselected experts of the selected set and that are indicative of an expertise relevant to at least one question in the updated plurality of survey questions, sending the updated plurality of survey questions to the updated set of experts, expanding the updated set of experts by adding experts noted in referrals in answers received to the updated plurality of questions, automatically updating the value metric scores of the expanded updated set of experts via the programmable device as the function of the timeliness of the responses received and the degree of correlation of the answers to the expected answers, and removing satisfied questions from the updated plurality of survey questions, until each question in the updated plurality of survey questions is satisfied and removed.

2. The method of claim 1, wherein the automatically the updating value metric scores of the expanded set of experts via the programmable device as the function of the timeliness of the response received from the associated expert comprises:

increasing the value metric score of a first expert as a function of an elapsed time of a response of the first expert to a sent survey question that is less than a normal response time; and decreasing the value metric score of a second expert in response to a failure to receive a response to a sent survey question from the second expert within an allowable time for response to the sent survey question.

3. The method of claim 2, further comprising:

sending a reminder to the second expert in response to the failure to receive the response to the sent survey question from the second expert within the threshold allowable time for response; and removing the second expert from the updated set of experts in response to a failure to receive a response to the reminder within an allowable time for response to the reminder.

4. The method of claim 2, wherein the automatically updating value metric scores of the expanded set of experts via the programmable device is further a function of a number of referrals to an expert from other experts, further comprising:

increasing the value metric score of a third expert if multiple experts refer to the third expert as an appropriate person to answer a given question of the survey; and decreasing the value metric score of a fourth expert relative to a fifth expert if the fourth expert has relatively fewer references to the given question of the survey relative to the fifth expert.

5. The method of claim 1, wherein the expected answer is a hypothesis answer or a mean answer of a totality of answers received from the experts with respect to a sent question, the method further comprising:

determining that an answer received from a sixth expert has a degree of correlation to the expected answer that is outside of an acceptable variance; and labeling the sixth expert an outlier expert; or decreasing a value metric score of the sixth expert.

6. The method of claim 5, wherein the updating the plurality of survey questions by removing questions satisfied by response answers from the selected set of experts comprises:

determining that a question has been satisfied with a satisfactory answer upon receiving a total number of responses that meets a threshold number of responses; or determining that a question has been satisfied with a satisfactory answer if an answer to a question is within a threshold variance of correlation to the expected answer.

7. The method of claim 6, further comprising:

determining that a question has been satisfied with a satisfactory answer upon receiving a response from a non-outlier expert and a response from an outlier expert.

8. A system, comprising:

a processing unit, computer readable memory and a computer readable storage system;

first program instructions to select a set of experts that each have higher value metrics scores relative to value metric scores of other unselected experts of a population of known experts and that are indicative of an expertise relevant to at least one question in a plurality of survey questions and to expand the selected set of experts by adding experts from the population of known experts that are noted in referrals in answers received in response to questions of a plurality of survey questions sent to the selected set of experts;

second program instructions to determine a degree of correlation of an answer within said response received from the associated expert to an expected answer;

third program instructions to update the value metric scores of the experts as a function of a timeliness of the response received from an associated expert and of the determined degree of correlation of the answer; and fourth program instructions to update the plurality of survey questions by removing questions satisfied by response answers from the selected set of experts and send out the updated plurality questions to the selected expert sets until each question in the updated plurality of survey questions is satisfied and removed as determined by iterative repetitive application of the first, second and third instructions; and wherein the first, second, third and fourth program instructions are stored on the computer readable storage system for execution by the processing unit via the computer readable memory.

9. The system of claim 8, wherein the third program instructions to update the value metric scores of experts are further to:

increase the value metric score of a first expert as a function of an elapsed time of a response of the first expert to a sent survey question that is less than a normal response time; and decrease the value metric score of a second expert in response to a failure to receive a response to a sent survey question from the second expert within an allowable time for response to the sent survey question.

10. The system of claim 9, wherein the third program instructions to update the value metric scores of experts are further to:

send a reminder to the second expert in response to the failure to receive the response to the sent survey question from the second expert within the threshold allowable time for response; and remove the second expert from the updated set of experts in response to a failure to receive a response to the reminder within an allowable time for response to the reminder.

11. The system of claim 9, wherein the third program instructions to update the value metric scores of experts as a function of a number of referrals to an expert from other experts are further to:

increase the value metric score of a third expert if multiple experts refer to the third expert as an appropriate person to answer a given question of the survey; and decrease the value metric score of a fourth expert relative to a fifth expert if the fourth expert has relatively fewer references to the given question of the survey relative to the fifth expert.

12. The system of claim 8, wherein the expected answer is a hypothesis answer or a mean answer of a totality of answers received from the experts with respect to a sent question, and wherein the second and third program instructions are further to:

determine that an answer received from a sixth expert has a degree of correlation to the expected answer that is outside of an acceptable variance; and label the sixth expert an outlier expert; or decrease a value metric score of the sixth expert.

13. The system of claim 12, wherein the second program instructions are further to:

determine that a question has been satisfied with a satisfactory answer upon receiving a total number of responses that meets a threshold number of responses; or determine that a question has been satisfied with a satisfactory answer if an answer to a question is within a threshold variance of correlation to the expected answer.

14. The system of claim 13, wherein the second program instructions are further to:

determine that a question has been satisfied with a satisfactory answer upon receiving a response from a non-outlier expert and a response from an outlier expert.

15. A computer program product for collection of data or information from a dynamic and adaptive target group selection, the computer program product comprising:

a computer readable storage device;

first program instructions to select a set of experts that each have higher value metrics scores relative to value metric scores of other unselected experts of a population of known experts and that are indicative of an expertise relevant to at least one question in a plurality of survey questions and to expand the selected set of experts by adding experts from the population of known experts that are noted in referrals in answers received in response to questions of a plurality of survey questions sent to the selected set of experts;

second program instructions to determine a degree of correlation of an answer within said response received from the associated expert to an expected answer;

third program instructions to update the value metric scores of the experts as a function of a timeliness of the response received from an associated expert and of the determined degree of correlation of the answer; and fourth program instructions to update the plurality of survey questions by removing questions satisfied by response answers from the selected set of experts and send out the updated plurality of questions to the selected expert sets until each question in the updated plurality of survey questions is satisfied and removed as determined by iterative repetitive application of the first, second and third instructions; and wherein the first, second, third and fourth program instructions are stored on the computer readable storage device.

16. The computer program product of claim 15, wherein the third program instructions to update the value metric scores of experts are further to:

increase the value metric score of a first expert as a function of an elapsed time of a response of the first expert to a sent survey question that is less than a normal response time; and decrease the value metric score of a second expert in response to a failure to receive a response to a sent survey question from the second expert within an allowable time for response to the sent survey question.

17. The computer program product of claim 16, wherein the third program instructions to update the value metric scores of experts are further to:

send a reminder to the second expert in response to the failure to receive the response to the sent survey question from the second expert within the threshold allowable time for response; and remove the second expert from the updated set of experts in response to a failure to receive a response to the reminder within an allowable time for response to the reminder.

18. The computer program product of claim 16, wherein the third program instructions to update the value metric scores of experts as a function of a number of referrals to an expert from other experts are further to:

increase the value metric score of a third expert if multiple experts refer to the third expert as an appropriate person to answer a given question of the survey; and decrease the value metric score of a fourth expert relative to a fifth expert if the fourth expert has relatively fewer references to the given question of the survey relative to the fifth expert.

19. The computer program product of claim 15, wherein the expected answer is a hypothesis answer or a mean answer of a totality of answers received from the experts with respect to a sent question, and wherein the second and third program instructions are further to:

determine that an answer received from a sixth expert has a degree of correlation to the expected answer that is outside of an acceptable variance; and label the sixth expert an outlier expert; or decrease a value metric score of the sixth expert.

20. The computer program product of claim 19, wherein the second program instructions are further to:

determine that a question has been satisfied with a satisfactory answer upon receiving a total number of responses that meets a threshold number of responses; or determine that a question has been satisfied with a satisfactory answer if an answer to a question is within a threshold variance of correlation to the expected answer.

21. The computer program product of claim 20, wherein the second program instructions are further to:

determine that a question has been satisfied with a satisfactory answer upon receiving a response from a non-outlier expert and a response from an outlier expert.

* * * * *